UNITED STATES PATENT OFFICE 1,921,120

AMINO ALPHA-PHENOXY NAPHTHALENE

Ernest F. Grether, Midland, Mich., assignor to The Dow Chemical Company, Midland, Mich., a Corporation of Michigan No Drawing. Original application March 19, 1929, Serial No. 348,362. Divided and this application April 15, 1931. Serial No. 530,441

4 Claims. (Cl. 260—130.5)

The present invention relates to certain new compounds derived from phenyl-alpha-naphthyl ether, viz nitro and amino derivatives thereof, the last named being a useful dyestuff intermediate, together with methods for the preparation of such compounds.

In my pending application, Serial No. 289,081, filed June 28, 1928, I have described and claimed certain sulfonic and nitro-sulfonic acid derivatives of the above mentioned phenyl-alpha-naphthyl ether. Also, in pending application, Serial No. 348,362, filed March 19, 1929, I have described and claimed certain new azo dyestuffs prepared by coupling diazotized amino alpha-phenoxy naphthalene with certain coupling components; and in pending application, Serial No. 372,806, filed June 21, 1929, I have described and claimed azo dyestuffs prepared by coupling certain diazotized aromatic amines into a 2.3-hydroxy-naphthoyl-amino-naphthyl-phenyl ether. The present application, which is a division of the aforesaid prior application, Serial No. 348,362, deals more especially with the preparation of the aforesaid amino-phenoxy-naphthalene. This invention, then, comprises the new product, together with the steps involved in making the same, hereinafter fully described and particularly pointed out in the claims, the following description setting forth one of the various ways in which the principle of my invention may be used.

I make the desired product by first nitrating phenyl-alpha-naphthyl ether and then reducing the mono-nitro-compound so obtained to form the mono-amino-compound. The nitration of the aforesaid ether according to the usual procedure does not yield satisfactory results, owing largely to the relative insolubility of the ether and its nitro derivative in an aqueous medium. I have found that far better results are realized when the nitration is carried out in a medium of glacial acetic acid. Accordingly, I proceed as follows:—

I dissolve 1 mole of phenyl-alpha-naphthyl ether in 6 parts by weight of glacial acetic acid, then gradually and with stirring add a solution consisting of 1 mole of concentrated nitric acid mixed with 2 parts by weight of glacial acetic acid. The temperature is maintained below 25° C. throughout the reaction. After all of the nitric acid has been added, stirring is continued for about one-half hour, then ice water to the amount of $\frac{1}{10}$ to $\frac{1}{5}$ of the volume of the reaction mixture is added. The mono-nitro compound separates as a precipitate of yellow crystal flakes, which are filtered from the mother liquor and washed with water. If the liquor is made more dilute, the crystal product is obtained in a less pure form. The product, recrystallized from alcohol or acetic acid, has M. P. 93°–94° C. The probable formula of the product is:—

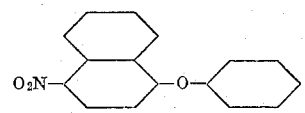

The reduction of the nitro compound for the preparation of the amino compound is performed in the usual way, viz:—

A mixture consisting of 200 parts by weight of iron filings, 400 parts by weight of water and 6 parts by weight of concentrated hydrochloric acid is heated with stirring while 100 parts by weight of the above mentioned nitro-phenoxy-naphthalene are gradually added. When the mixture has become colorless, it is neutralized with sodium carbonate, filtered, and the amino compound is extracted with benzene or some other suitable solvent. The extract is dried, the solvent distilled off, and finally the amine distilled in vacuum. It forms colorless crystals of M. P. 54° C. The hydrochloric acid salt is but slightly soluble in water. The amine has the probable formula:—

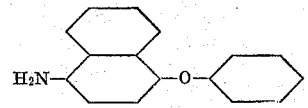

Other modes of applying the principle of my invention may be employed instead of the one explained, change being made as regards relative quantities of the various materials employed, provided the ingredients stated by any of the following claims or the equivalent of such stated ingredients be employed.

I therefore point out and distinctly claim as my invention:—

1. The method of making amino-alpha-phenoxy naphthalene having probably the formula

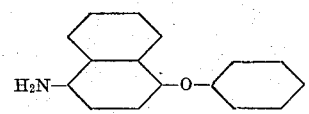

which comprises nitrating alpha-phenoxy naphthalene to form a mono-nitro-derivative thereof having a melting point of approximately 93°–94° C. and having probably the formula

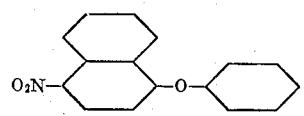

and reducing the latter.

2. In a method of making amino-alpha-phenoxy naphthalene the step which consists in reducing a mono-nitro-alpha-phenoxy naphthalene having a melting point of approximately 93°–94° C. and having probably the formula

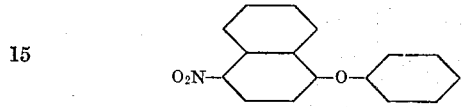

to the corresponding amine.

3. In a method of making amino-alpha-phenoxy naphthalene the step which consists in reducing mono-nitro-alpha-phenoxy naphthalene having a melting point of approximately 93°–94° C. and having probably the formula

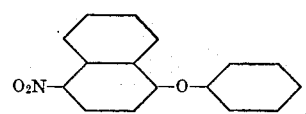

by reacting said nitro-compound with iron and hydrochloric acid.

4. As a new compound, 1-amino-4-phenoxy naphthalene having probably the formula,

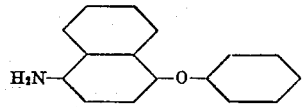

and having a melting point of 54° C.

ERNEST F. GRETHER.